United States Patent
Biagi et al.

[15] 3,701,011
[45] Oct. 24, 1972

[54] PROBE CONTAINING DIODE ASSEMBLY FOR RADIO FREQUENCY PEAK POWER DETECTION

[72] Inventors: Alvaro D. Biagi, Huntington Station, N.Y.; Sirio S. D'Amato, Rocky Hill, Conn.

[73] Assignee: Republic Electronics Industries Corp., Huntington Station, N.Y.

[22] Filed: Aug. 19, 1970

[21] Appl. No.: 65,159

[52] U.S. Cl. ............... 324/72.5, 324/95, 324/103 P
[51] Int. Cl. ...... G01r 31/02, G01r 21/04, G01r 19/16
[58] Field of Search ............ 324/72.5, 95, 128, 103; 329/105, 109, 206; 333/81 R, 79 R

[56] References Cited

UNITED STATES PATENTS

| | | | |
|---|---|---|---|
| 2,875,405 | 2/1959 | Frederico | 324/95 |
| 2,109,561 | 3/1938 | Wright | 329/206 X |
| 2,777,995 | 1/1957 | Henning | 324/95 X |
| 2,782,381 | 2/1957 | Dyke | 333/81 X |

*Primary Examiner*—Rudolph V. Rolinec
*Assistant Examiner*—Ernest F. Karlsen
*Attorney*—Edward H. Loveman

[57] ABSTRACT

A probe assembly for applying to a peak power meter detected radio frequency signals whose peak power is to be measured, comprising a tubular conductive member having a plurality of interconnected detachable cylindrical parts. A co-axial transmission line at one end of the tubular member receives the radio frequency signals which are applied to a disk resistor and an anode of a thermionic ceramic planar diode within the tubular member. The cathode of the diode is connected to a filter which includes a geometric capacitor. The diode detects the radio frequency signals and produces a video frequency envelope which after filtering is passed to the peak power meter.

4 Claims, 4 Drawing Figures

INVENTORS
ALVARO D. BIAGI
SIRIO S. D'AMATO

BY Edward M Lueman
ATTORNEY

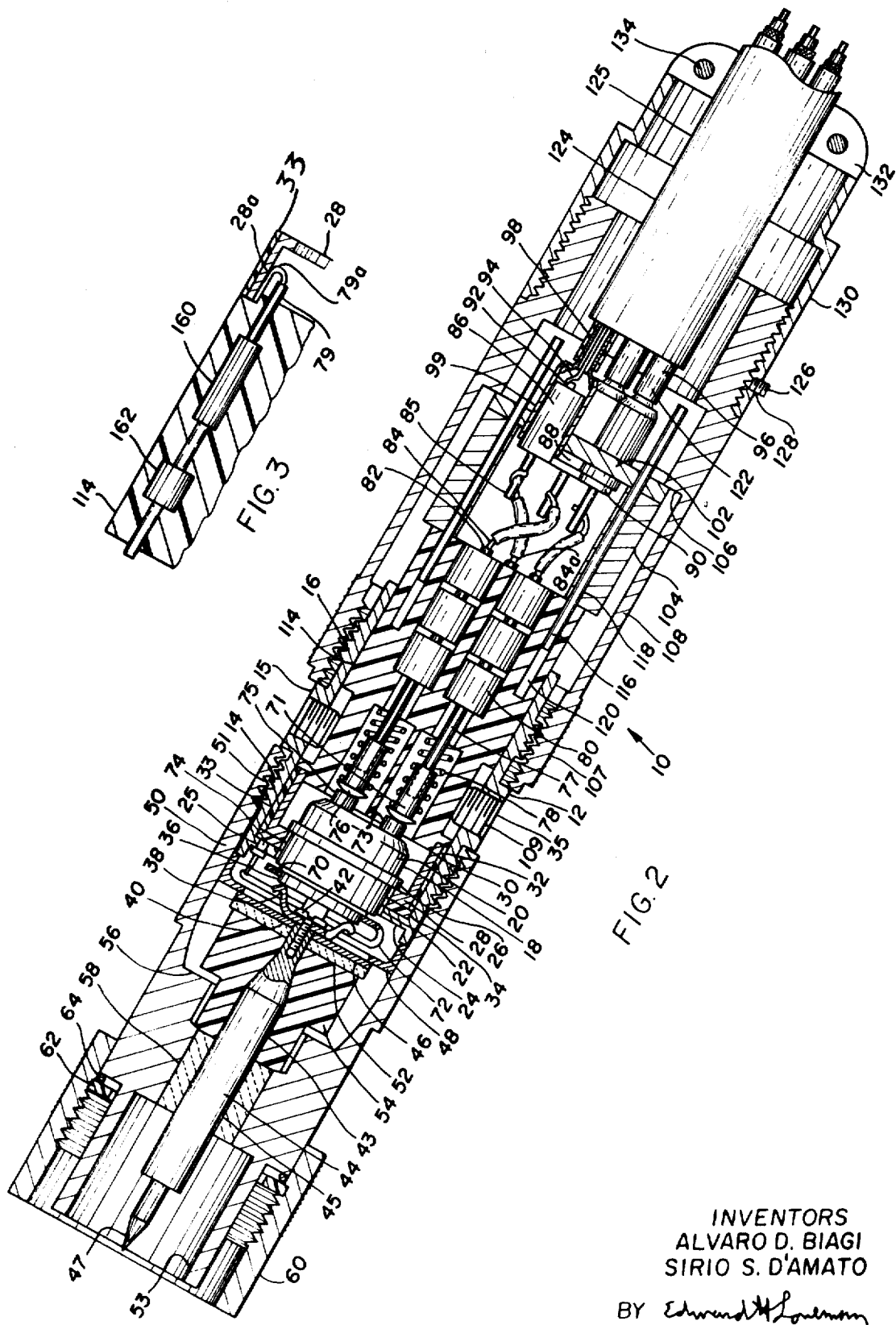

PROBE CONTAINING DIODE ASSEMBLY FOR RADIO FREQUENCY PEAK POWER DETECTION

This invention relates to a radio frequency probe used in conjunction with a peak power meter and more specifically with a radio frequency probe for detecting and filtering radio frequency signals which are to be applied to a peak power meter.

Radio frequency probes heretofore have been used to convey radio frequency signals from a source thereof to a peak power meter. Such probes which contain an impedance matching circuit are generally connected to a co-axial cable by means of which the RF input signals are conveyed to the meter. Due to unavoidable line losses in the cable at high frequencies, i.e. 1,000 megahertz accuracy of power measurements can not be assured, and measurement errors can run as high as 25 percent. In order to overcome this situation numerous proposals have been made to compensate for errors by special design of the circuit of the power meter, which thus has resulted in peak power meter circuits of great complexity. As the complexity of the circuit increases, considerable increases in cost of the equipment result and also causes an increase in servicing problems, introduces possibilities of other errors occurring and makes the equipment difficult to operate.

Some of the prior peak power meter designs include the use of standard cells and galvanometers. Others use a barretter element to integrate the radio frequency input pulses while others use a crystal diode as a detector of peak voltage applied across a known resistive load and still others use pulse sampling and comparison techniques involving special semiconductor switches. All these prior expedients still fail to provide the high accuracy over an extended range of operation.

The probe embodying the present invention when used in conjunction with properly designed peak power meter circuit and a precision attenuator makes it possible to measure peak power in the range of 0-5,000 watts with an accuracy of ±0.5 db over the dynamic range of measurement. According to the invention, the probe detects radio frequency pulses as high as 1,000 megahertz which are then transmitted as video frequency pulses to an appropriate peak power meter preferably one containing a slideback voltage generator.

The probe includes a co-axially mounted disk resistor and thermionic ceramic planar diode which is used to detect the radio frequency input signals and produce at its output video frequency pulses which can be applied to a slideback voltage circuit for direct comparison. The slideback voltage may then be read on a D'Arsonval type of voltmeter calibrated in watts.

It is therefore, a principal object of the instant invention to provide a probe for picking up radio frequency signals from a power source to be measured and applying the signals as video frequency pulses to a peak power meter.

It is a further object of the instant invention to provide a probe as hereinbefore described by means of which line losses between the power source and peak power meter are reduced to negligible magnitudes.

It is another object of the instant invention to provide a probe as hereinbefore described which includes a disk resistor with a planar diode connected thereacross to detect the RF signal and produce a corresponding video frequency signal.

Still another object of the instant invention is to provide an appropriate filter circuit in the probe to prevent RF signals from being transmitted to the A.C. line from the planar diode filaments.

These and other objects and many of the attendant advantages of this invention will be readily appreciated as the same becomes better understood by reference to the following detailed description when considered in connection with the accompanying drawings in which:

FIG. 2 is an enlarged longitudinal sectional view of the probe taken along line 2—2 of FIG. 1.

FIG. 3 is a fragmentary longitudinal sectional view of the probe taken along line 3—3 of FIG. 1.

Figure 1:
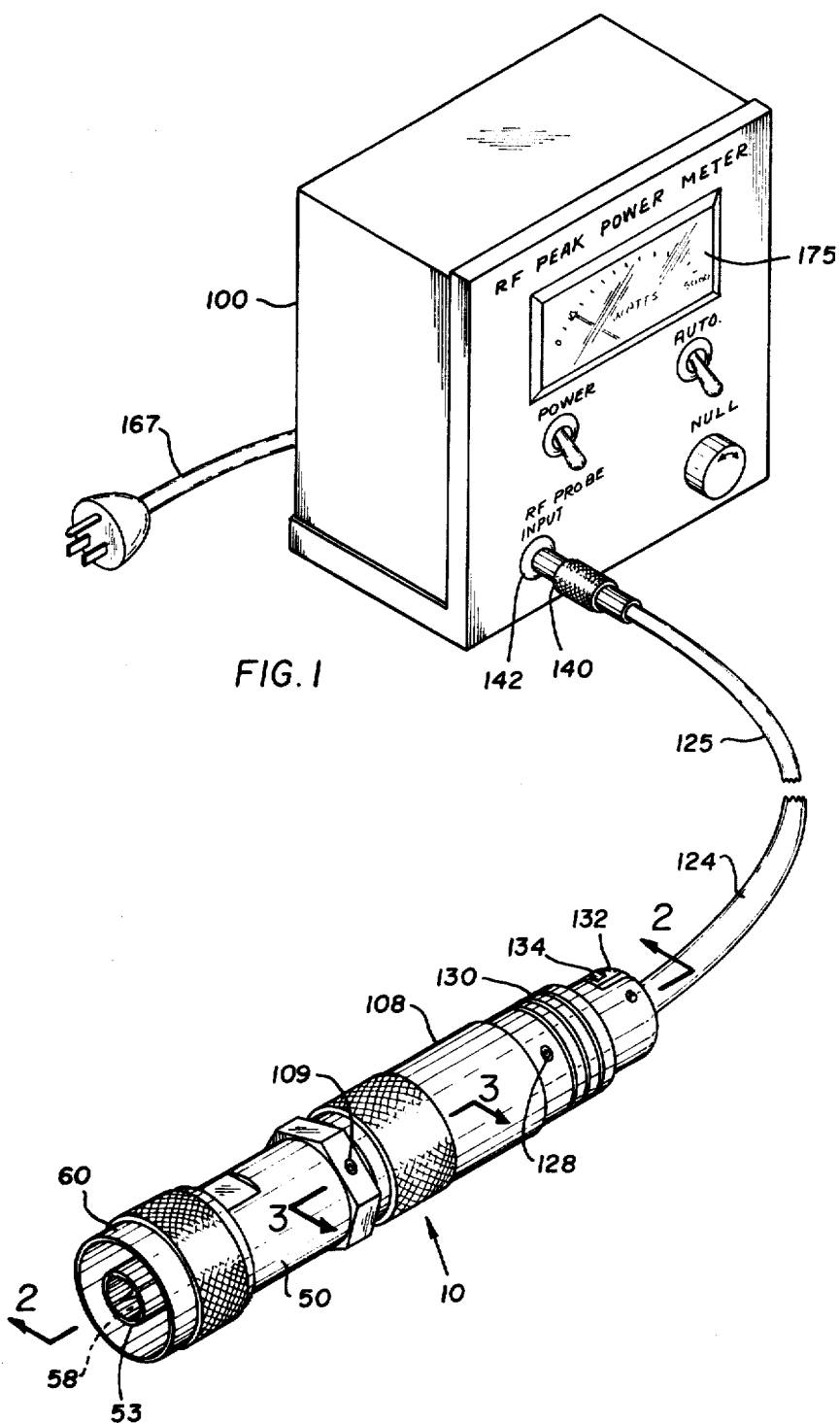
FIG. 1 is a perspective view of a probe embodying the invention shown in association with a peak power meter.

Referring now to the drawings wherein like reference characters designate like or corresponding parts throughout, there is illustrated in FIGS. 1 and 2, a probe assembly generally designated by reference numeral 10 comprising a cylindrical central housing 12 which has an external threading 14 and 16 at opposite end portions and an intermediate hexagonal section 15. Coaxially disposed inside the housing 12 is a thermionic ceramic planar diode 18 which has a ceramic body 20 fitted in an opening 22 in a partition 24 of the housing 12. The diode 18 has a cathode 26 which extends radially and circumferentially of the body 20 and abuts an annular end flange 28 of a cylindrical plate 30 which forms a part of a geometric capacitor 32. An insulative sleeve 33 around the plate 30 serves as a dielectric and the housing 12 serves as a grounded other plate of the capacitor 32. The end flange 28 is electrically insulated from the partition 24 by the insulative disk 34. An anode 36 of the diode 18 is contacted by a plurality of spring fingers 38 of a fixed terminal 40 which is secured by a screw 42 to the inner end of a central axial core or rod 44 serving as the center conductor of a coaxial transmission line to receive radio frequency signals at the input end of the probe assembly 10.

The terminal 40 is juxtaposed to the center of a disk resistor 46 the outer rim of which abuts a spacer ring 48 snugly fitted inside a conductive sleeve 50 to ground the resistor thereto. The sleeve 50 is internally threaded at 51 to engage the threading 14. The disk resistor 46 is bonded to a ceramic disk 52 which serves as a mechanical support and abuts an insulative plug 54 seated in a recess 56 in the sleeve 50. A portion 43 of the core or rod 44 is surrounded by the plug 54 and a ceramic spacer 58 surrounds another portion 45 of the core 44. Sleeve 50 has a cylindrical extension 53 at its left open end which is also coaxial with the spacer 58. Surrounding the tip 47 of the core 44 and the sleeve 53 is an internally threaded connector ring 60. This ring may engage an appropriate fitting of a connector by means of which RF input signals will be applied to the probe for peak power measurements by a meter assembly 100 shown in FIG. 1. Ring 60 is held rotationally on sleeve 50 by a plastic or fiber ring 62 and an O-ring 64. The sleeve 50 with the rod 44 thus serves as a plug or connector for the probe.

Referring now to FIG. 3 there is illustrated the end flange 28 which is in intimate contact with a spring clip 79a of a contact 79. The contact 79 is connected to a filter or choke 160 and a single ferrite bead 162. Power to the cathode 26 is thus filtered by the ferrite bead 162 and the choke 160 and applied via contact 79 and spring clip 79a to the end flange 28 which is in contact with the cathode 26.

A c-ring 70 is fitted on the disk shaped head of anode 36 of the diode 18. One end of a one-turn coil 72 is connected to the C-ring 70. The other end of the coil 72 is connected to a grounded pin 74 seated in an opening 25 in the partition 24. The diode 18 has a pair of contact pins 75 and 73 at its right end to which heater current is conducted. Abutting the pins 75 are respective contact members 76 and 71 urged by springs 78 to contact their respective pins 77. The contact members 76, 71, are slidably fitted on respective input terminal pins 77 of ferrite beads 80 which serve as filter elements. Connected to respective output terminals 82 of the ferrite beads 80 and 162 (FIG. 3) are three insulated conductors 84 connected respectively to an input terminal 85 of each of three capacitors 86, 88 and 90. Each of the output terminals 92 of each of the capacitors is connected to a central wire 94 of a respective shielded conductor 96. The wire is shielded by a braided shield 98 and grounded by a sleeve 99 to an end wall 102 of a cup shaped conductive spacer 104, which abuts a shoulder 106 formed inside an outer tubular shell 108 internally threaded at its left end 107 to engage the threading 16 of the housing 12. The ferrite beads are disposed in a plastic shell 114 fitted in the right end of housing 12. A plurality of pins 116 extend through respective bores 118 in the spacer 104 and terminate in respective bores 120 in the shell 114. The pins prevent relative rotation of the spacer 104 and the shell 114 and thus prevent twisting of wires 84. A plurality of set screws 109 in flange section 35 of the housing 12 engage the shell 114. The conductors 96 are externally covered by insulative jackets 122 and these in turn are all enclosed in outer plaster jacket 124 of a cable 125 by means of which detected signals are transmitted to motor assembly 100. A set screw 126 inserted in a threaded hole 128 in a tubular hood 130 secures the hood to the externally threaded right end of the outer shell 108. A clamp 132 is held by screws 134 on the right end of the hood 130 and engages the cable 125. The components in the probe are thus all mounted and held in a tight fitting, secure assembly. Cable 125 terminates in a connected 140 (FIG. 1) by means of which the probe assembly is connected to meter assembly 100 at input terminal 142.

Figure 4:
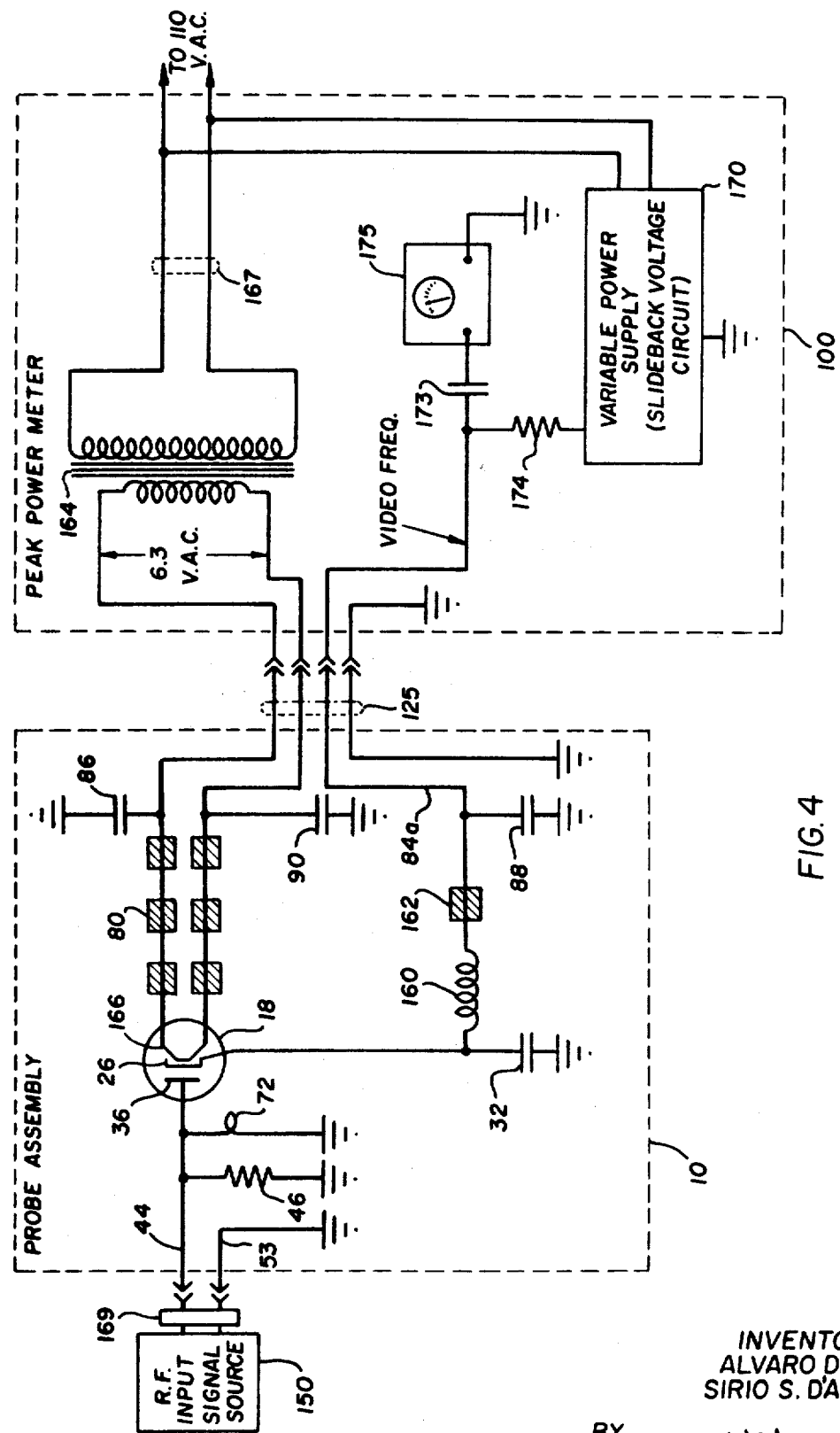
FIG. 4 is a schematic diagram of the equivalent circuit of the probe, with a block diagram of an associated peak power meter circuit.

FIG. 4 shows the probe assembly 10 schematically. The probe assembly of FIG. 1 and 2 is capable of operation up to 500 watts, however, if a precision 10 db attenuator 169 similar to that disclosed in U.S. Pat. Nos. 3,260,291 and 3,157,846 is used the probe will be capable of measuring from 0 to 5,000 watts. Radio frequency signals from a signal source 150 are applied via the attenuator 169 between the axial rod 44 and the concentric grounded sleeve extension 53 to the disk resistor 46 and the coil 72. The anode 36 of the thermionic ceramic planar diode 18 is connected to resistor 46. The cathode 26 of the diode is connected to the geometric capacitor 32. Thus the diode 18 is connected for radio frequency input signals across the disk resistor 46. As previously described the power to the cathode 26 is supplied by an input wire 84a and filtered by the inductor 160, the ferrite bead 162 and the capacitor 88. The alternating heater current to the filament 166 is supplied by a stepdown transformer 164 in the peak power meter 100. The transformer 164 is energized by a 110 volts AC input power supply via a power cable 167. The capacitors 86 and 90 serve as filters to suppress RF signals from entering the AC power supply.

The video frequency voltage is compared with the voltage generated by a slideback voltage generator in variable power supply 170. When the slidebakc voltage equals the peak applied video frequency voltage, the slideback voltage is applied via a fixed resistor 174 and an isolation capacitor 173 to a meter 175. This meter may be calibrated in watts as indicated in FIG. 1.

The peak power measurement thus obtained readily attains an accuracy of ±0.5 db over a range of 0–5,000 watts. It benefits from the simplified circuit within the probe assembly which substancially eliminates radio frequency line losses.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A probe assembly for applying to a peak power meter detected radio frequency signals from a coaxial transmission line means said assembly comprising a tubular conductive member connected to said coaxial line means and comprising a miniature thermionic planar diode having a cylindrical ceramic body with an anode at one end thereof and a cathode extending circumferentially and radially of said ceramic body, said diode having a filamentary heater, a plurality of resistive ferrite beads in said member connected in circuit with said heater; and shielded wires connected to said beads for passing heating current to said filamentary heater, a resistor having a disc shape with its center contacting said anode and its periphery in direct circuit with said tubular member.

a filter including a cylindrical capacitor plate abutting said cathode and an inductor connected to said cathode; and an output line connected to said filter for passing the video frequency envelope of the detected radio frequency signals to said peak power meter; and wherein said tubular member comprises a cylindrical housing, said diode being located in said housing; a shell detachably engaged on one end of said housing, said transmission line comprising an axial rod in said shell connected to said resistor, and a cylindrical extension of said shell surrounding said rod.

2. A probe assembly as defined in claim 1, wherein said tubular member further comprises a sleeve detachably engaged on the other end of said housing, and a cylindrical hood detachably engaged on said sleeve.

3. A probe assembly as defined in claim 2, further comprising a plurality of insulated, shielded conductors extending axially of said sleeve and hood, said output line and said wires being axially disposed inside said shielded conductors.

4. A probe assembly as defined in claim 3, further comprising other capacitors in said tubular member connected to said wires and output line for filtering radio frequency signal.

* * * * *